United States Patent
Selitser

(10) Patent No.: US 9,720,682 B2
(45) Date of Patent: Aug. 1, 2017

(54) INTEGRATED SOFTWARE AND HARDWARE SYSTEM THAT ENABLES AUTOMATED PROVISIONING AND CONFIGURATION OF A BLADE BASED ON ITS PHYSICAL LOCATION

(75) Inventor: Boris Selitser, Castro Valley, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 810 days.

(21) Appl. No.: 13/339,074

(22) Filed: Dec. 28, 2011

(65) Prior Publication Data
US 2012/0166786 A1    Jun. 28, 2012

Related U.S. Application Data

(60) Provisional application No. 61/427,754, filed on Dec. 28, 2010.

(51) Int. Cl.
| | | |
|---|---|---|
| *G06F 15/177* | (2006.01) | |
| *G06F 9/44* | (2006.01) | |
| *H04L 29/08* | (2006.01) | |
| *G06F 15/16* | (2006.01) | |
| *G06F 13/40* | (2006.01) | |

(52) U.S. Cl.
CPC ............ *G06F 8/70* (2013.01); *G06F 13/4081* (2013.01); *G06F 15/161* (2013.01); *H04L 67/34* (2013.01)

(58) Field of Classification Search
CPC .............................. G06F 15/161; G06F 15/177
USPC .................................................. 709/220–222
See application file for complete search history.

(56) References Cited

U.S. PATENT DOCUMENTS

| 6,895,007 B1 | 5/2005 | Teraoka |
| 7,114,065 B2 | 9/2006 | Chu et al. |
| 7,114,068 B2 | 9/2006 | Chu et al. |
| 7,130,995 B2 * | 10/2006 | Chu et al. ..................... 713/1 |

(Continued)

FOREIGN PATENT DOCUMENTS

| GB | 2469690 | 10/2010 |
| JP | 2004334679 | 11/2004 |

(Continued)

OTHER PUBLICATIONS

International Search Report dated May 30, 2012 for Application No. PCT/US2011/067389, 10 pages.

(Continued)

*Primary Examiner* — Jason Recek
(74) *Attorney, Agent, or Firm* — Tucker Ellis LLP

(57) ABSTRACT

An integrated software and hardware system is described that functions as a communications service broker in a telecommunications (telecom) network environment. The system can be used to perform mediation and orchestration of services in the telecom network. The integrated system provides the ability of fully automated configuration and provisioning of a compute blade module based on its physical location (in a chassis enclosure). In accordance with an embodiment, each blade in the chassis is assigned either a worker or bootstrap role. The worker blades perform the core processing of the service broker functionality and the bootstrap blades are used to provide the bootstrapping and administration of the worker blades.

20 Claims, 3 Drawing Sheets

(56) References Cited

U.S. PATENT DOCUMENTS

| | | |
|---|---|---|
| 7,415,535 B1 | 8/2008 | Kuik et al. |
| 8,032,776 B2 | 10/2011 | Merkin |
| 2003/0105904 A1* | 6/2003 | Abbondanzio et al. ...... 710/302 |
| 2003/0226004 A1* | 12/2003 | Abbondanzio et al. .......... 713/1 |
| 2005/0010715 A1 | 1/2005 | Davies et al. |
| 2006/0026235 A1 | 2/2006 | Schwarz |
| 2006/0026325 A1 | 2/2006 | Huang et al. |
| 2006/0143255 A1* | 6/2006 | Shinohe et al. .............. 707/205 |
| 2006/0155837 A1 | 7/2006 | Kobayashi et al. |
| 2006/0167886 A1* | 7/2006 | Kantesaria et al. ............ 707/10 |
| 2007/0100933 A1 | 5/2007 | Davies et al. |
| 2007/0130305 A1* | 6/2007 | Piper ..................... G06F 9/5077 709/223 |
| 2007/0168476 A1 | 7/2007 | Davies et al. |
| 2007/0276997 A1 | 11/2007 | Luning et al. |
| 2008/0022148 A1 | 1/2008 | Barnea |
| 2008/0028107 A1 | 1/2008 | Cherian et al. |
| 2008/0104217 A1 | 5/2008 | Srinivasa et al. |
| 2008/0271039 A1 | 10/2008 | Rolia |
| 2009/0044036 A1 | 2/2009 | Merkin |
| 2009/0222836 A1 | 9/2009 | Paval |
| 2009/0240907 A1* | 9/2009 | Crandell ................. G06F 21/31 711/163 |
| 2009/0276513 A1 | 11/2009 | Holdaway et al. |
| 2010/0049822 A1 | 2/2010 | Davies et al. |
| 2010/0057905 A1* | 3/2010 | Enscoe ................ G06F 11/302 709/224 |
| 2010/0064169 A1 | 3/2010 | Davies et al. |
| 2010/0125477 A1 | 5/2010 | Mousseau et al. |
| 2010/0205421 A1 | 8/2010 | Campbell |
| 2011/0010702 A1 | 1/2011 | Vrushabendrappa et al. |
| 2011/0119756 A1* | 5/2011 | McClusky .......... G06F 21/6245 726/17 |
| 2012/0166786 A1 | 6/2012 | Selitser |
| 2012/0167073 A1 | 6/2012 | Stevens |
| 2013/0117359 A1 | 5/2013 | Husain |

FOREIGN PATENT DOCUMENTS

| | | |
|---|---|---|
| JP | 2006164095 | 6/2006 |
| JP | 2007183837 | 7/2007 |
| JP | 2008140280 | 6/2008 |
| JP | 2009129204 | 6/2009 |
| WO | WO 2009007619 | 1/2009 |

OTHER PUBLICATIONS

Oracle International Corporation, Oracle Communications Service Broker Netra 6000 High Availability Manager Administrators Guide, Mar. 2012, 168 pages.

State Intellectual Property Office of the People's Republic of China, Search Report for Chinese Patent Application No. 201180044932.0, Apr. 24, 2015, 10 pages.

* cited by examiner

US 9,720,682 B2

INTEGRATED SOFTWARE AND HARDWARE SYSTEM THAT ENABLES AUTOMATED PROVISIONING AND CONFIGURATION OF A BLADE BASED ON ITS PHYSICAL LOCATION

CLAIM OF PRIORITY

The present application claims the benefit of the following U.S. Provisional Patent Application, which is incorporated by reference herein in its entirety:

U.S. Provisional Patent Application No. 61/427,754, entitled "INTEGRATED SOFTWARE AND HARDWARE SYSTEM THAT SERVES AS A COMMUNICATIONS SERVICE BROKER," by Boris Selitser et al., filed on Dec. 28, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and in particular to providing an integrated software/hardware service broker in the telecom network.

BACKGROUND

In the context of telecommunications (telecom), a mobile network operator or wireless service provider provides telephone and other services to its mobile phone subscribers. These operators typically deploy the equipment to offer these services, such as the radio transmitter network and the core network. Additionally, operators often deploy other service platforms such as voicemail, short message service (SMS) centers and many others.

As operators evolve current network infrastructure from legacy Signaling System Number 7 (SS7) to IP-based networks, they must continue to deliver and leverage legacy services to protect key revenue streams. Service providers must also continue to innovate while maintaining support for legacy Intelligent Network (IN) functionality and changing network infrastructure, developing new and compelling offerings that create strategic competitive advantage. What is desirable is an integrated system that enables service interaction across diverse network types, orchestrates multiple services in real-time and enables the creation of innovative blended services.

BRIEF SUMMARY

In accordance with various embodiments, an integrated software and hardware system is described that functions as a communications service broker in a telecommunications (telecom) network environment. The system can be used to perform mediation and orchestration of services in the telecom network. The integrated system provides the ability of fully automated configuration and provisioning of a computing blade based on its physical location (in a chassis enclosure). The system includes a chassis that contains enclosure slots for multiple computing blades. In accordance with an embodiment, each blade in the chassis is assigned either a worker or bootstrap role. The worker blades perform the core processing of the service broker functionality and the bootstrap blades are used to provide the bootstrapping and administration of the worker blades.

DETAILED DESCRIPTION

In accordance with various embodiments, an integrated software and hardware system is described that functions as a communications service broker in a telecommunications (telecom) network environment. The system can be used to perform mediation and orchestration of services in the telecom network.

In accordance with an embodiment, the service broker is engineered as a single system that is comprised of service broker software, a selection of hardware, operating system level software and the management software to integrate all of these together. In accordance with one particular embodiment, the materials of the targeted Hardware platform can include Netra N6000 chassis, a number of Netra X6270 M2 LP blades, and OPUS NEM switches. However, many other types of hardware materials are possible within the scope of the present invention.

In accordance with an embodiment, the integrated system provides the ability of fully automated configuration and provisioning of a computing blade module based on its physical location (in a chassis enclosure). As used herein, a blade denotes a computing device including one or more central processing units (CPU's) and a physical memory. In accordance with an embodiment, each blade in the chassis is assigned either a worker or bootstrap role depending on the software running on it. The worker blades perform the core processing of the service broker functionality and the bootstrap blades are used to provide the bootstrapping and administration of the worker blades. In accordance with an embodiment, the worker role implies no disk storage or persistent state. Workers inherit identity and instance-specific configuration from the chassis slot that they are running in. These properties of the system allow the worker blades to be easily swapped and new worker blades to be added with little overhead management.

Figure 1:
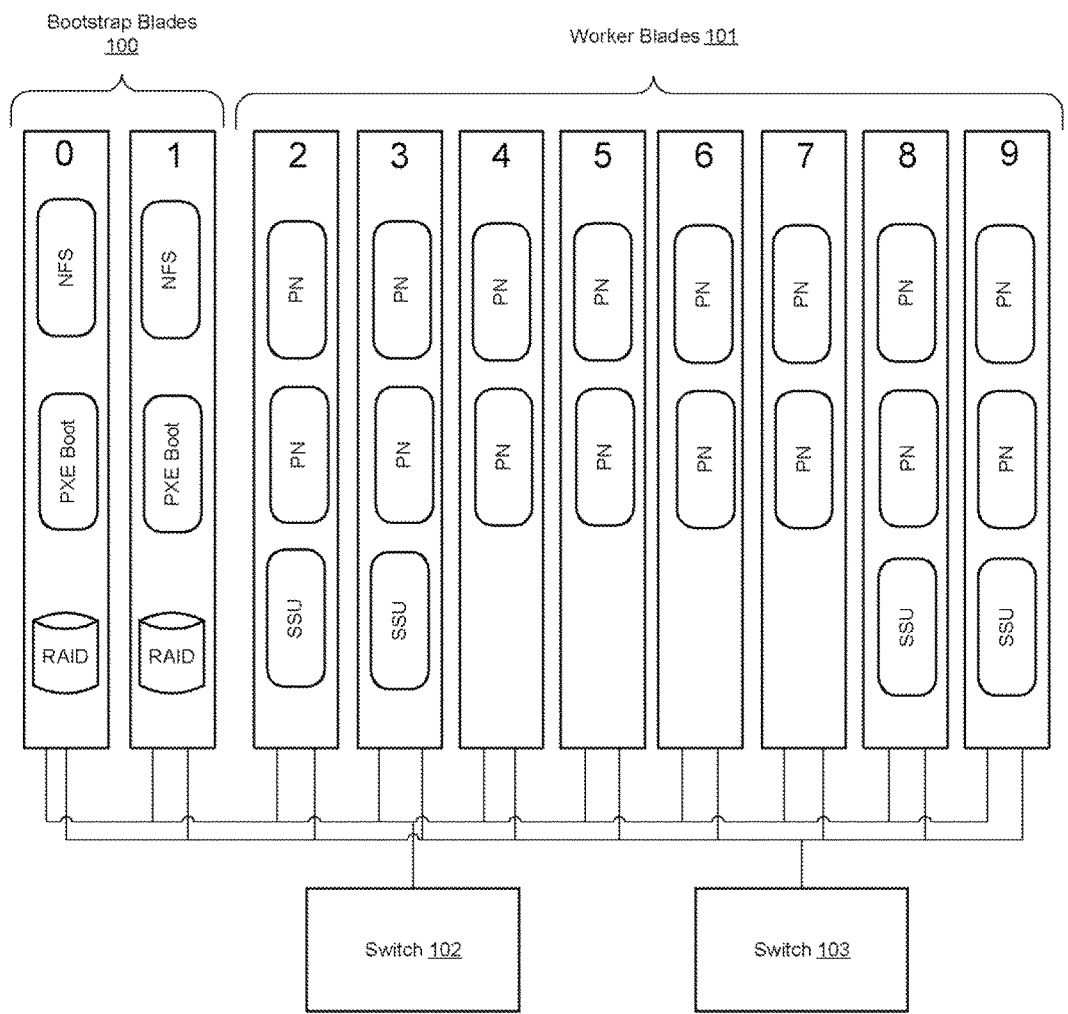
FIG. 1 is an illustration of the integrated system components as part of a single chassis, in accordance with various embodiments of the invention.

FIG. 1 is an illustration of the integrated system components as part of a single chassis, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

At the outermost layer the system is made up of one or more chassis running service broker (SB) software. The system supports scaling to multiple chassis connected by a TOR (Top of Rack) switch. In the illustrated embodiment, within each chassis there are up to 10 blades interconnected by dual redundant switches 102, 103. The switches are also used to provide redundant connections from the chassis to the TOR switches and through TOR switches to other networks on customer premises. FIG. 1 shows the key components of the system as part of a single chassis. Each blade is designated a worker or bootstrap role depending on the software that is running on it. Worker blades 101 run the SB application software and are utilized for performing the core SB function. Bootstrap blades 100 are used to provide a bootstrapping and administration function to the worker blades. Bootstrap blades run services that worker blades depend on. These services include network boot, redundant file system, and others. For high availability (HA) reasons bootstrap blades are provisioned in pairs and a single pair is sufficient to provide services to multiple SB chassis. As shown in FIG. 1, a single full chassis could have 2 bootstrap and 8 worker blades. In accordance with an embodiment, the worker role implies no disk storage or persistent state. Software running on workers relies on bootstrap blades to be available when it starts up after which point it could continue to run independently. Workers also inherit their identity and instance specific configuration from the chassis slot they are running in. These properties allow easily swapping and adding new workers with little management overhead. Bootstrap blades provide system-level functions only and do not process any SB application traffic. On average the load on the bootstrap blades should be relatively low. These characteristics should minimize chances of failure of the bootstrap blades. All the persistent state for the system is kept on the bootstrap blades where redundant access to that state is also provided. In accordance with an embodiment, bootstrap blades are not required to be online and functional for the workers to continue to operate as normal. Bootstraps should be present when a worker blade boots or worker processes restart.

In accordance with an embodiment, two types of SB processes run on the worker blades. Processing Node (PN) processes part of the Processing Tier and Signaling Server Unit (SSU) processes part of the Signaling Tier. SSU processes interface SB to external networks, don't use much memory, and are I/O intensive. The actual brokering logic and stateful protocol mediation occurs in the more memory-intensive PN processes. Also, SSU processes usually consume much less CPU than PN and fewer SSU than PN processes are required to support a given traffic volume. Roughly a ratio of 1-to-4 is used between SSU and PN processes.

Service Broker software and configuration can be bundled together into Domain Images (DI). Domain Images are groupings of jar files containing the SB binaries and any associated configuration. PN and SSU processes are based on two separate DI's stored on the bootstrap blades. When a PN or SSU process starts up it pulls the binaries with related configuration from the corresponding DI. DI's are changed by a web-based administration console running on the bootstrap blades. These same DI's could also be updated by an external management console. External in this case refers to a console process running outside the chassis.

In accordance with one embodiment, a minimum high availability (HA) deployment is comprised of a single chassis, 4 blades, and two switches. This configuration can provide at least dual redundant software components and redundancy for some of the hardware components. The 4 blades come out of 2 bootstrap and 2 worker instances. PN and SSU processes would be collocated on each of the worker blades and a single instance of such blade would be sufficient to maintains SB functional. A minimum of two chassis would be required to have dual redundancy of all hardware (HW) components. Multiple chassis would be connected through external switches.

In accordance with an embodiment, bootstrap blades provide a set of services towards the worker blades. These services include operating system (OS) booting, SB software deployment, software configuration, and SB logging. In accordance with an embodiment, the bootstrap blades are also where all the persistent state of the system is saved. This allows the worker blades to be easily replaced as whatever state needs to be preserved across reboots is going to be available via the bootstraps. It can be seen that the services bootstraps provide are critical for the normal operation of the system and for being able to recover from failures. For this reason the bootstrap blades should be highly available. Bootstrap blades run in primary-secondary configuration for services that should be provided in a singleton fashion across all the bootstrap instances. Services that should be run as singletons include pre-boot execution environment (PXE) server, dynamic host configuration protocol (DHCP) server, SB logging server, SB web console, and additional infrastructure for network file system (NFS) service.

Most worker blades have similar software running on them except for the SB level profile. As noted earlier there are two main SB software profiles that a blade could have. A PN-only profile or a PN-plus-SSU profile. In addition to that, each blade has a particular identity in terms of the internet protocol (IP) addresses it has assigned on various virtual local area networks (VLANs) and other unique identifiers. Each blade inherits it's identity from the chassis enclosure slot it happens to be running in. The identity is static and is therefore associated with the slot and not with the blade. This simplifies provisioning as blades are swapped or added to empty slots. At most, the PXE server configuration needs to be updated to reflect the media access control (MAC) address of the network interface card (NIC) for a blade being added. The differences in two SB software profiles are captured as PXE boot images. Each image consists of the OS, external Management Agent, and configuration scripts aware of blades identity. Two images exist to reflect PN-only and PN-plus-SSU profiles. The external Management Agent (eMA) implementation is the same on both images and it is set up to start after the OS boots. Process Instance Identity (PII)—logical identifier of a process within a blade; it is derived from the current Sys_Admin VLAN IP address and the process's fixed order relative to other processes on the blade; it is different from a PID as it remains constant between process restarts. PII exists for both PN and SSU processes. It serves as a predetermined way to refer to a SB process instance. Example use is to group process configuration specifics within a DI.

Figure 2:
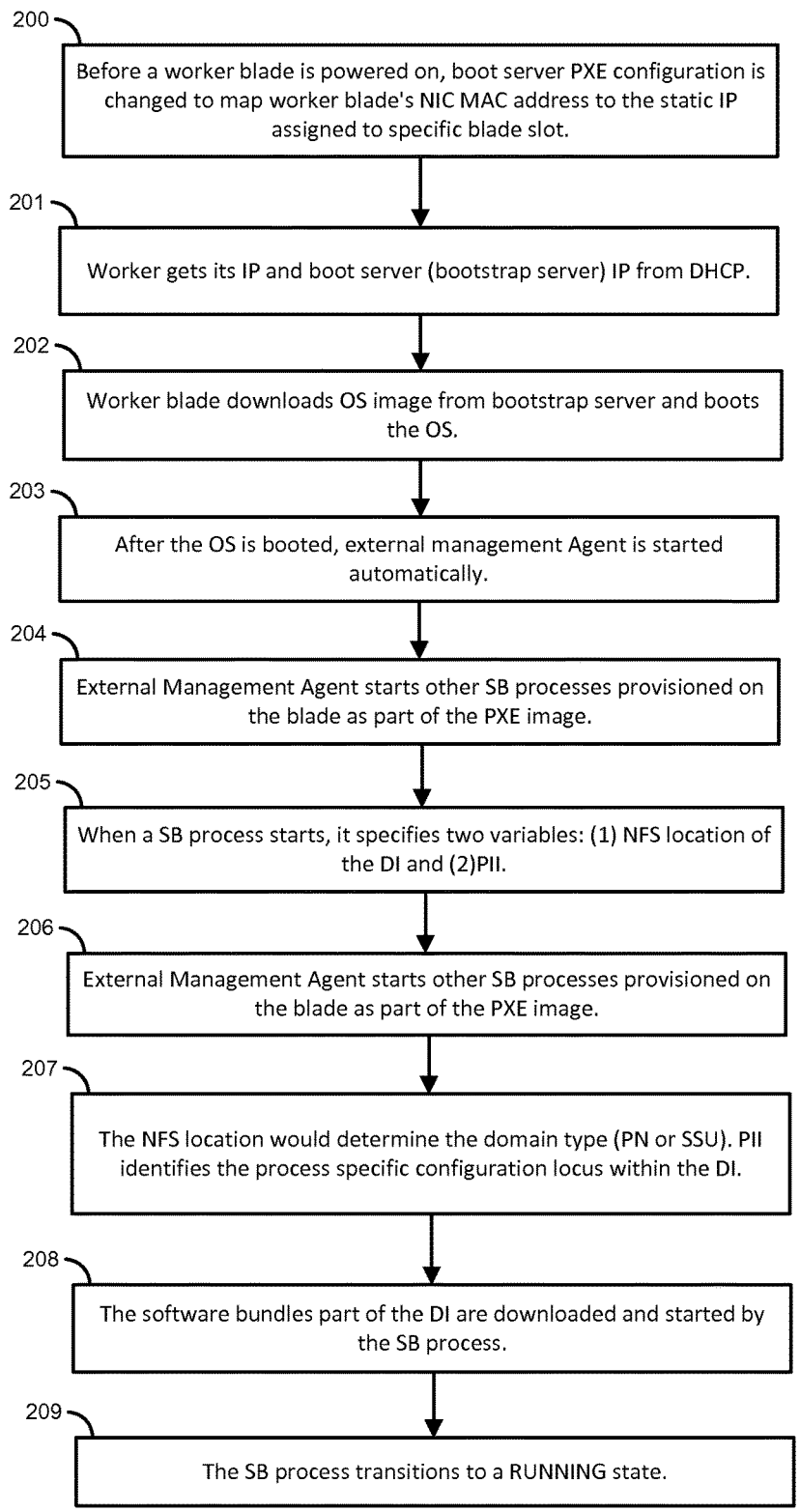
FIG. 2 is a flow chart illustration of the process for automated provisioning and bootstrapping of a compute blade module based on its physical location in a chassis enclosure, in accordance with various embodiments of the invention.

FIG. 2 is a flow chart illustration of the process for automated provisioning and bootstrapping of a compute blade module based on its physical location in a chassis enclosure, in accordance with various embodiments of the invention. Although this figure depicts functional steps in a particular sequence for purposes of illustration, the process is not necessarily limited to this particular order or steps.

One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated in FIG. 2, the process for bootstrapping can take the following sequence. In step 200, before the worker blade is powered on, boot server PXE configuration is changed to map worker blade's NIC MAC address to the static IP assigned to specific blade slot. In step 201, the worker blade gets its IP and boot server (bootstrap server) IP from DHCP. In step 202, the worker blade downloads OS image from boot server (bootstrap server) and boots the OS. In step 203, after OS is booted, eMA is started automatically. In step 204 eMA starts other SB processes provisioned on the blade as part of the PXE image. In step 205, when a SB process starts it specifies two variables: a) NFS location of the DI and b) PII. In step 206, the NFS location would determine the domain type (PN or SSU). In step 207, PII identifies the process specific configuration locus within the DI. In step 208, the software bundles part of the DI are downloaded and started by the SB process. In step 209, the SB process transitions to RUNNING state.

In accordance with an embodiment, two bootstrap blades are used to provide storage services to one or more chassis comprising a SB deployment. In many instances, two bootstrap blades would be sufficient for all service broker scale-out scenarios. When a deployment consists of more than one chassis, the bootstrap blades should be allocated to different chassis. Each bootstrap blade comes with two on-board disks that are used for all persistent state for the system. This provides four disks in total with 300 GB of space on each disk. The effective storage capacity of the complete system can still be 300 GB if the four disks are used for mirroring, redundancy, and increased availability of stored state. This amount of storage is deemed sufficient for most SB scale-out scenarios. In addition, there can exist various forms of logs generated by SB runtime. Such logs are configured to be rolled and backed-up at regular intervals to external backup storage media. In order to provide redundancy at the storage level within each bootstrap blade the pair of disks are arranged in a redundant array of independent disks (RAID) 1. Beyond RAID for mirroring across the disks within a given blade there is replication of data across bootstrap blades. This ensures that either of the bootstrap blades could take over the primary function at any given point in time. The working option for keeping the disks between to bootstrap blades in-sync is distributed replicated block device (DRBD) which is layered over software RAID.

In accordance with an embodiment, each bootstrap blade disk comprises two partitions: (1) a local boot/swap/var partition; and (2) a serving partition. The local boot/swap/var partition is for the bootstrap itself, it is pre-installed from an image on the bootstrap blades. The serving partition holds the majority of the disk space and contains the following elements:
a. the DHCP server and configuration;
b. the PXE server and configuration;
c. 2 images served by PXE—PN-only & PN-plus-SSU; (alternatively, this could reduce to single image if eMA knows what to start based on PII)
d. Service broker console installation;
e. 2 Domain Images—grouping of differences in software & configuration between PN & SSU; and
f. Logging server and logs Worker blades mount the serving partition FS from bootstrap blades over NFS. DI images are only read by SB processes in the beginning when the process starts up. In accordance with one embodiment, the serving partition over NFS is never updated by the SB worker processes directly and is therefore accessed in read-only mode. On each worker there should be sufficient memory to run RAM disk for the OS plus eMA. The DI remain mounted over NFS to allow simpler upgrade of SB components.

In various embodiments, any high availability and load balancing software (e.g. Red Hat Cluster Suite) can be used to manage the singleton service availability and failover across bootstrap blades. The notion of primary or secondary is managed at the OS instance level between the two bootstrap blades. This implies that when a given bootstrap instance is designated as the primary instance, all the singleton services would migrate to that instance. DRBD could also be integrated with HA and load balancing software amongst other clustering solutions.

Figure 3:
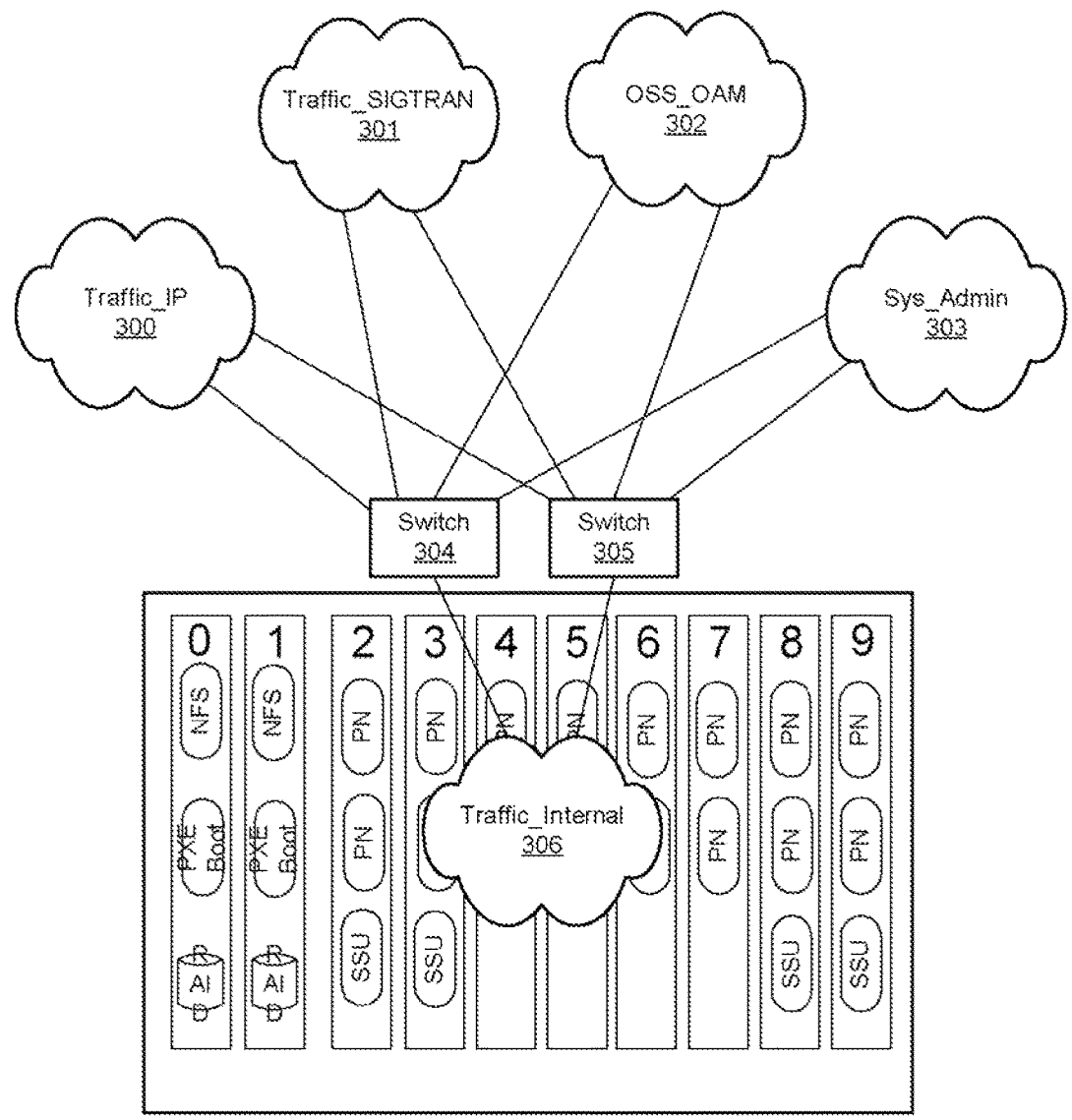
FIG. 3 is an illustration of the connectivity and types of traffic that can be processed by the service broker system, in accordance with various embodiments of the invention.

FIG. 3 is an illustration of the connectivity and types of traffic that can be processed by the service broker system, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, redundant connectivity between the blades within a single chassis and from the chassis to the outside world can be enabled by dual switches 304, 305. The two switches can be included in the chassis and each switch has a single port connection to every blade therefore providing redundancy at the switch level. In accordance with an embodiment, the SB is able to fully perform all of it's functions with only one switch being operational. The PN and SSU SB processes have different connectivity needs. In accordance with an embodiment, the PN processes only communicate with other PN processes or with SSU processes, never with the external entities. All external connectivity happens through the SSU processes. In accordance with an embodiment, uniform deployment can be utilized between all PN and SSU instances, meaning that all PN's will share all traffic processing by interacting with all the present SSU's and every SSU is going to send and receive all types of external signaling traffic (i.e. SS7, SIP, Diameter, etc).

In accordance with an embodiment, the types of network traffic processed by the integrated system can be segregated into five functional areas. In many cases these traffic segments will connect to different networks on the operator's premises. The five segments represent a prototypical superset that could be collapsed into fewer segments in simpler deployments. Segments prefixed with 'Traffic' represent network traffic relating to the brokering function SB performs, while others have to do with all aspects of administration. The following is a description of each of these segments:
a. Traffic_IP 300—this groups all of the internet protocol (IP) based protocols, including session initiation protocol (SIP), hypertext transfer protocol (HTTP), Diameter, short message peer-to-peer protocol (SMPP), etc. In accordance with an embodiment, this type of connectivity is only required by SSU processes.

b. Traffic_SIGTRAN 301—this includes all the higher layer SS7 protocols carried over stream control transmission protocol (SCTP). In accordance with an embodiment, this type of connectivity is used by SSU processes only.

c. Traffic_Internal 306—coordination between PN's and PN-to-SSU communication. In accordance with an embodiment, this is used by PN and SSU processes.

d. OSS_OAM 302—a separate segment of lower privilege for SB functional administration by OSS personnel, offers higher security and lower interference levels through isolation. In accordance with an embodiment, this is used by PN and SSU processes.

e. Sys_Admin 303—'root' level administration of all the components required to keep the system running, used by PXE boot to download OS image, runs DHCP for PXE. In accordance with an embodiment, this is used by all blades.

For the purposes of security, bandwidth guarantees, and management virtual local area networks (VLAN's) are used to segregate the five types of network traffic. For the OS on worker blades that is only running PN processes none of the SSU specific VLAN's are accessible. In accordance with an embodiment, the blades can be equipped with two 1 GbE on-board ethernet ports. Which are expanded to two 10 GbE ports by installing Dual 10 GbE PCIe 2.0 FEM connector on each blade motherboard. With two 10 GbE ports on-board, enough bandwidth should be available to isolate the 5 VLAN traffic types and fully saturate the CPU's of 8 worker blades in performing core SB function. In most instances, the worker blades that run SSU processes have the biggest demands in terms of bandwidth and connectivity. Each blade can have two PCIe EM slots for adding additional NIC's. For SSU blades one slot can be reserved for addition of a SS7 TDM card. The remaining slot could be used in the future to add a dual port 10 GbE card for NIC level redundancy.

Bonding can be used when connecting each blade to the two switches. Dual physical ports form a single bonded ethernet pair connection from each blade. A bond from each blade connects to both switches in Mode 0—round-robin. Mode 0 is chosen since it provides fault tolerance while increasing the bandwidth (with some switch protocol limitations). Mode 0 also simplifies wiring since both ports could be connected to both switches in any permutation.

In accordance with an embodiment, tagged VLAN's are chosen to split the five different types of traffic. All five VLAN's run over the bond. Tagged VLAN's allow separating the traffic for purposes mentioned above and allow enforcement of differentiated bandwidth. One example is to guarantee that blade boot that downloads an OS image does not consume the available bandwidth thereby impacting traffic processing.

In accordance with an embodiment, chassis-to-chassis and chassis-to-edge connectivity can be accomplished through Sun OPUS ToR or some other external switches. Dual top-of-rack switches with connections to each of the chassis switches would be used for redundancy at this level. For additional bandwidth multiple cables could be used for NEM switch to external switch connections. The number and types of cables for each switch to switch connection are dictated by the capacity requirements and rack layout of a particular deployment. The actual chassis-to-chassis, rack-to-rack, or rack-to-distribution connectivity would be dictated by the network topology and switch preference.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for automated provisioning of a compute blade, said method comprising:
providing a chassis having a plurality of enclosure slots that are adapted to contain compute blades;
detecting that a compute blade has been inserted into an enclosure slot of said chassis;
determining a physical location where said compute blade has been inserted;
configuring said compute blade as a worker blade based on an identity inherited from said physical location;

downloading an image having at least an operating system, an external management agent, and one or more service broker processes to the worker blade from a bootstrap blade;

booting the operating system;

automatically starting the external management agent from the image in response to booting the operating system; and starting, via the external management agent, the one or more service broker processes provisioned on the worker blade.

2. The method of claim 1, wherein the worker blade is stateless and performs application logic and core processing of a system, and wherein the bootstrap blade provides a set of bootstrapping and administration functions for the worker blade.

3. The method of claim 1, wherein the worker blade is executing a processing node (PN) process and a signaling server unit (SSU) process, wherein the SSU process processes interface calls with external networks and wherein the PN process brokers the logic and stateful protocol mediation.

4. The method of claim 1, wherein a persistent state is stored on the bootstrap blade where redundant access to said state is provided.

5. The method of claim 1, wherein before the worker blade is powered on, a bootstrap blade pre-boot execution environment (PXE) configuration is changed to map the worker blade's network interface card (NIC) media access control (MAC) address to a static internet protocol (IP) address assigned to the enclosure slot holding said worker blade.

6. The method of claim 1, wherein the service broker processes are provisioned on the worker blade as part of a pre-boot execution environment (PXE) image.

7. The method of claim 1, wherein each started service broker process specifies a network file system location of a domain image and a process instance identity.

8. The method of claim 7, wherein the network file system location determines a type of the domain image.

9. The method of claim 1, wherein each process executing on the worker blade is associated with a lifecycle state selected from one of the following:

safe mode state with minimal components loaded and intended for low level diagnosis and recovery purposes;

administrative mode state wherein all the components have been loaded, but are available for management purposes only; and running mode state wherein the process is fully online, has joined cluster services and is ready to receive and process traffic.

10. A system for automated provisioning of a compute blade, comprising:

a computer including one or more hardware processors;

a chassis having a plurality of enclosure slots that are adapted to contain compute blades; and one or more compute blades, including a bootstrap blade and one or more worker blades, wherein each worker blade is inserted into an enclosure slot of said chassis;

wherein the bootstrap blade operates to:

determine a physical location where each worker blade is inserted, configure each worker blade based on an identity inherited from said physical location; and wherein each worker blade operates to:

download an image having at least an operating system, an external management agent, and one or more service broker processes from said bootstrap blade, boot the operating system, automatically start the external management agent from the image in response to an operating system boot, and start, via the external management agent, the one or more service broker processes provisioned on the worker blade.

11. The system of claim 10, wherein each worker blade is stateless and performs application logic and core processing of a system, and wherein the bootstrap blade provides a set of bootstrapping and administration functions for the worker blade.

12. The system of claim 10, wherein each worker blade executes a processing node (PN) process and a signaling server unit (SSU) process, wherein the SSU process processes interface calls with external networks and wherein the PN process brokers the logic and stateful protocol mediation.

13. The system of claim 10, wherein a persistent state is stored on the bootstrap blade where redundant access to said state is provided.

14. The system of claim 10, wherein before the worker blade is powered on, a bootstrap blade pre-boot execution environment (PXE) configuration is changed to map the worker blade's network interface card (NIC) media access control (MAC) address to a static internet protocol (IP) address assigned to the enclosure slot holding said worker blade.

15. The system of claim 10, wherein the service broker processes are provisioned on each worker blade as part of a pre-boot execution environment (PXE) image.

16. The system of claim 10, wherein each started service broker process specifies a network file system location of a domain image and a process instance identity.

17. The system of claim 16, wherein the network file system location determines a type of the domain image.

18. A non-transitory computer readable storage medium storing one or more sequences of instructions that are executable by one or more processors to perform a set of steps, comprising:

providing a chassis having a plurality of enclosure slots that are adapted to contain compute blades;

detecting that a compute blade has been inserted into an enclosure slot of said chassis;

determining a physical location where said compute blade has been inserted;

configuring said compute blade as a worker blade based on an identity inherited from said physical location;

downloading an image having at least an operating system, an external management agent, and one or more service broker processes to the worker blade from a bootstrap blade;

booting the operating system;

automatically starting the external management agent from the image in response to booting the operating system; and starting, via the external management agent, the one or more service broker processes provisioned on the worker blade.

19. The non-transitory computer readable storage medium of claim 18, wherein the worker blade is stateless and performs application logic and core processing of a system, and wherein the bootstrap blade provides a set of bootstrapping and administration functions for the worker blade.

20. The non-transitory computer readable storage medium of claim 18, wherein the worker blade executes a processing node (PN) process and a signaling server unit (SSU) process, wherein the SSU process processes interface calls with external networks and wherein the PN process brokers the logic and stateful protocol mediation.

\* \* \* \* \*

UNITED STATES PATENT AND TRADEMARK OFFICE
CERTIFICATE OF CORRECTION

PATENT NO. : 9,720,682 B2  
APPLICATION NO. : 13/339074  
DATED : August 1, 2017  
INVENTOR(S) : Selitser Page 1 of 1

It is certified that error appears in the above-identified patent and that said Letters Patent is hereby corrected as shown below:

In the Specification

In Column 5, Line 63, after "PII)" insert -- ; --.

In Column 5, Line 67, after "logs" insert -- . --.

Signed and Sealed this  
Thirteenth Day of February, 2018

Andrei Iancu  
*Director of the United States Patent and Trademark Office*